July 3, 1962
G. ALFIERI
3,042,153
ELECTROPNEUMATIC SERVOCONTROL DEVICE FOR
THE ENGINE BRAKE OF VEHICLES
Filed Feb. 5, 1959
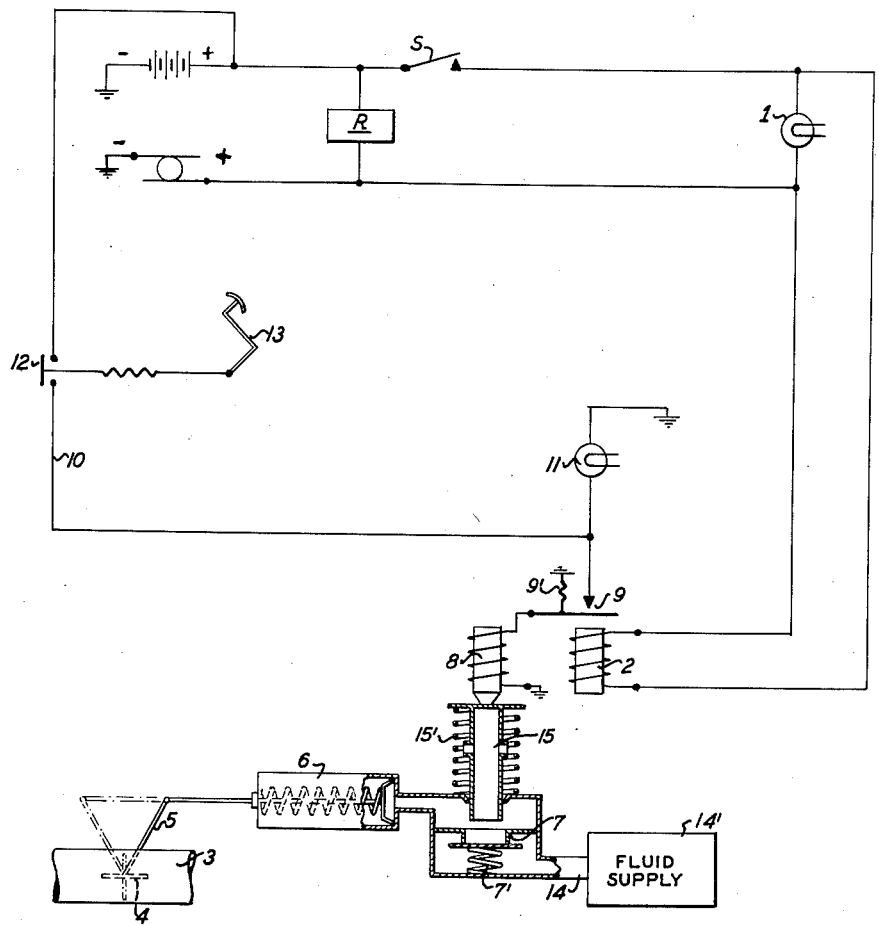
INVENTOR
GIUSEPPE ALFIERI

United States Patent Office 3,042,153
Patented July 3, 1962

3,042,153
ELECTROPNEUMATIC SERVOCONTROL DEVICE
FOR THE ENGINE BRAKE OF VEHICLES
Giuseppe Alfieri, Milan, Italy, assignor to Fabbrica
Italiana Magneti Marelli S.p.A., Milan, Italy, a company of Italy
Filed Feb. 5, 1959, Ser. No. 791,420
Claims priority, application Italy Feb. 21, 1958
1 Claim. (Cl. 188—99)

The present invention relates to improvements in servo-control devices for engine brakes of vehicles of the type comprising essentially a pneumatic operating element, a member for obturating the exhaust conduit of the engine actuated by the pneumatic operating element and a manual control circuit for activating said operating element through the intermediary of an electro-distributor.

Known devices of this kind have the drawback that the operation of the engine brake takes place only following a specific control operation by the driver who must act upon a special switch to cause the activation of the electrodistributor and, therefore, actuation of the operating element. The driver may, however, not effect that act either by oversight or in order not to divert his attention at such a critical time of driving such as braking. As a consequence, in practice use is seldom derived of the engine brake.

It is an object of the invention to render the intervention of the engine brake independent of any control operation by the driver, by automatically causing the operation of the engine brake each time the service brakes of the vehicles are actuated, and to deactivate the engine brake when the engine is close to its minimal running conditions so as not to cause—by untimely closure of the exhaust conduit—the stopping of said engine.

The device of the invention comprising among other things a relay in parallel with a lamp for signalling battery loading, is characterized in that in conditions of energization of said relay a contact is opened which is connected in the circuit for feeding the electrodistributor for the control of the intercepting valve placed between the compressed-fluid and the operating element, and in that said circuit is shunted to the signalling circuit of the stop light of the vehicle and is activated only if the feeding circuit for said signalling lamp is closed.

The accompanying drawing shows merely by way of example an electric circuit diagram of the apparatus of the invention. In the diagram are indicated battery B of the vehicle and dynamo D, connected in opposition to the battery and signalling lamp 1 between the battery and dynamo to indicate current flow therebetween. An ignition switch S switches in battery B and at the same time dynamo D is actuated in known manner. As is known this lamp is lit each time there occurs a reduction of speed of the dynamo, that is, when there occurs a difference of potential between the battery and dynamo. In parallel to the lamp 1 there is connected the coil of electromagnetic device 2 whose activation is contemporaneous to that of said lamp.

In the exhaust pipe 3 of the engine there is connected the engine brake device constituted by a gate or throttle 4 controlled through rod 5, by pneumatic operating cylinder 6.

The position in the FIGURE of obturating member 4, corresponds to the condition when the operating cylinder is deactivated; in the operating condition of cylinder 6, the obturator 4 assumes a position normal to the axis of the conduit 3, as indicated by dotted lines. Supplying fluid under pressure to cylinder 6 takes place through valve 7 controlled by electrodistributor 8.

According to the invention, the circuit of the electrodistributor 8 is fed through contact 9 controlled by device 2, connected by a shunt on the circuit 10 of the stop signalling lamp 11.

The contact 9 is normally held closed by spring 9' and is opened with consequent interruption of the feeding circuit of the electrodistributor 8, if the device 2 is in the energized condition.

The circuit 10 of the stop light is in turn controlled by switch 12 which provides closure thereof only as a consequence of brake pedal 13 being depressed.

The position of this switch in the drawing corresponds to that of a released brake pedal.

Operation of the device is as follows:

In the normal running condition of the vehicle, the brake pedal 13 is released and, therefore, the circuit 10 is open, lamp 11 is out and electrodistributor 8 deactivated. Hence the fluid cannot reach cylinder 6 through conduit 14 connected to tank 14', and therefore cylinder 6 is deactivated. In the braking stage and on the assumption that the device is de-energized when the driver depresses the pedal 13 thereby causing through switch 12 the closure of circuit 10, there occurs contemporaneously the lighting of lamp 11 and the activation of the electrodistributor 8, assuming that switch 9 is closed.

By means of control member 15, valve 7 is opened and springs 15', 7' are compressed, therefore cylinder 6 is actuated which provides actuating of the engine brake. Upon electrodistributor 8 being de-energized, spring 15' returns control member 15 to its original position and spring 7' closes valve 7.

The action of that brake, therefore, is concomitant with the main action controlled by the pedal 13.

If the operation of depressing the pedal 13 takes place with the device 2 energized, it is clear that the electrodistributor 8 will not be operative since switch 9 is open and consequently the device of the engine brake will not be activated.

The energizing of the electromagnetic device 2 takes place only if there occcurs a difference of potential between the positive battery terminal and the positive terminal of the dynamo, namely, due to the reduction of the rotational speed of the dynamo.

Under these conditions the intervention of the engine brake would cause the undesirable stalling of the engine, since the latter would be at minimum r.p.m. Relay R is a cutout inserted between the dynamo and the battery.

The device according to the invention obviates this latter inconvenience by limiting automatically the intervention of the engine brake to the stage of normal running of the vehicle.

What is claimed is:

Engine brake apparatus comprising an engine exhaust conduit, a throttle in said conduit, a cylinder, a piston in said cylinder and connected to said throttle for operating the same, a supply of pressure fluid, an electrovalve coupling said supply to said cylinder for operating said piston, a first switch coupled to said electrovalve, a source of voltage, a second switch coupling said source to said electrovalve via said first switch, an operator braking mechanism coupled to said second switch and adapted, on an operator-controlled braking operation to close said second switch, an electromagnetic device operatively associated with said first switch and adapted to open the same when provided with electrical power of predetermined magnitude, and a battery and dynamo coupled to said device, said battery and dynamo supplying to said device a magnitude of power in accordance with the speed of said dynamo, said throttle being rendered operative upon operation of said mechanism and with less than said predetermined magnitude of power being supplied to said electromagnetic device by said battery and dynamo.

References Cited in the file of this patent

UNITED STATES PATENTS

| | | |
|---|---|---|
| 1,940,712 | Ertz | Dec. 26, 1933 |
| 2,168,232 | Messinger | Aug. 1, 1939 |
| 2,781,114 | Slee et al. | Feb. 12, 1957 |
| 2,895,571 | Hanebeck | July 21, 1959 |

FOREIGN PATENTS

| | | |
|---|---|---|
| 742,323 | Great Britain | Dec. 21, 1955 |
| 783,900 | Great Britain | Oct. 2, 1957 |